United States Patent [19]

Kreth et al.

[11] Patent Number: 4,885,034

[45] Date of Patent: Dec. 5, 1989

[54] METHOD OF MAKING A COMPOSITE TiO₂ PIGMENT

[75] Inventors: Wolfgang Kreth, Duisburg; Wolf-Dieter Griebler, Moers, both of Fed. Rep. of Germany

[73] Assignee: Metallgesellschaft Aktiengesellschaft, Frankfurt am Main, Fed. Rep. of Germany

[21] Appl. No.: 88,882

[22] Filed: Aug. 24, 1987

[30] Foreign Application Priority Data

Aug. 23, 1986 [DE] Fed. Rep. of Germany ....... 3628661

[51] Int. Cl.⁴ .......................... C04B 14/30; C07C 1/36
[52] U.S. Cl. ..................................... 106/449; 106/438; 106/444; 106/447
[58] Field of Search ................ 106/300, 308 B, 308 F, 106/449, 436, 438, 444, 447

[56] References Cited

U.S. PATENT DOCUMENTS

| | | | |
|---|---|---|---|
| 2,068,066 | 1/1937 | O'Brien | 106/447 |
| 2,444,237 | 6/1948 | Aagaard et al. | 106/449 |
| 3,635,810 | 1/1972 | Schurr et al. | 204/181.6 |
| 3,948,676 | 4/1976 | Laüfer | 106/490 |
| 4,374,675 | 2/1983 | Scotti et al. | 106/300 |
| 4,375,989 | 3/1983 | Mäkinen | 106/300 |

FOREIGN PATENT DOCUMENTS

| | | |
|---|---|---|
| 346801 | 4/1931 | United Kingdom . |
| 1349089 | 3/1974 | United Kingdom . |

OTHER PUBLICATIONS

Derwent Abstracts, Abstract No. 80–00535c/01, "Titania and Titania Silica Catalyst", Japanese Patent J54146286-A, Nov. 15, 1979.

Derwent Abstracts, Abstract No. 79-10557B/06, "Moulded Catalyst Support Production", Japanese Patent J53146990-A, Dec. 21, 1978.

Derwent Abstracts, Abstract No. 80–00535c/01, "Titania And Titania Silica Catalyst", Japanese Patent J54146286-A, 11/15/79.

Chem. Abstract (Derwent) 79-10557B/06.

Encyclopedia of Chemical Technology-vol. 20 3/5/70.

Primary Examiner—Paul Lieberman
Assistant Examiner—Christine A. Skane
Attorney, Agent, or Firm—Herbert Dubno; Jonathan Myers

[57] ABSTRACT

In a process for producing a composite TiO₂ pigment which contains a white inert extender, the neutralization is simplified and the need for washing processes is eliminated in that a metatitanic acid suspension, which contains free and combined sulfuric acid and has been purified for the removal of chromophoric elements, is neutralized by an addition of calcium oxide and/or barium oxide in quantities which are stoichiometric with respect to total sulfate, the calcium sulfate and/or barium sulfate is precipitated in an intimate mixture with the metatitanic acid, and the coprecipitate is separated and dried. The precipitated calcium sulfate and/or barium sulfate is contained in the coprecipitate in an amount from 1 to 25% by weight.

5 Claims, No Drawings

METHOD OF MAKING A COMPOSITE TiO₂ PIGMENT

FIELD OF THE INVENTION

Our present invention relates to a process of producing a composite $TiO_2$ pigment containing a white or transparent extender.

BACKGROUND OF INVENTION

It is known to produce mixed pigments of titanium dioxide by a mechanical mixing of titanium dioxide pigments with, e.g., zinc oxide, calcium sulfate or barium sulfate.

Processes are known in which composite titanium pigments are produced and which comprise a precipitation of titanium oxide hydrate in the presence of a white carrier, such as barium sulfate, from a titanium-containing solution of a mineral acid by heating and hydrolysis. The precipitate is separated from the mother liquor, washed and calcined (German Patent Specification No. 570,875).

Titanium dioxide is used in its anatase and rutile modifications as a white pigment, which has found wide industrial application and can be made by a sulfate process or by a chlorine process.

In the sulfate process, ilmenite or titanium-containing slag is solubilized with sulfuric acid to provide a solution of titanyl sulfate and that solution is hydrolyzed to precipitate metatitanic acid.

The precipitate is subsequently washed in a sulfuric acid-containing medium until the heavy metal ions which would adversely affect the optical behavior, i.e. chromophores such as iron, chromium, vanadium and copper, have been substantially removed from the suspension to a substantial extent.

Owing to the process conditions the resulting metatitanic acid suspension usually contains between 5 and 10% free and combined sulfuric acid.

In a subsequent calcining step, which is necessary to provide the particle size that is required to achieve pigment properties, the sulfuric acid is eliminated as $SO_3$. That elimination of $SO_3$ during the calcining step requires an expensive purification of the exhaust gas.

If a titanium dioxide is required which has not been calcined, i.e., a product having a large surface area, the adhering sulfuric acid must be neutralized first in a neutralizing step, e.g., with a sodium hydroxide solution or ammonia. Such neutralization has the great disadvantage that the soluble salts formed by the neutralization must subsequently be washed out. The washing-out of such salts is very difficult because the neutralized metatitanic acid suspension has poor filtration properties.

OBJECT OF THE INVENTION

It is an object of the invention to avoid the disadvantages of known processes, particularly of the process specifically described above, and to produce a composite $TiO_2$ pigment in a simple and economical manner.

DESCRIPTION OF THE INVENTION

That object is accomplished in accordance with the invention in a process of producing a composite $TiO_2$ pigment which contains a white or transparent inert extender.

In the process in accordance with the invention, a metatitanic acid suspension, which contains free and combined sulfuric acid and has been purified for the removal of chromophoric elements, is neutralized by an addition of calcium oxide and/or barium oxide in quantities which are stoichiometric with respect to total sulfate, the calcium sulfate and/or barium sulfate is precipitated in an intimate mixture with the metatitanic acid, and the coprecipitate is separated and dried.

In the process in accordance with the invention the sulfuric acid which is still contained in the metatitanic acid suspension is combined with barium ions and/or calcium ions to form barium sulfate and/or calcium sulfate, which constitutes a difficulty soluble precipitate in an intimate mixture with the metatitanic acid.

Because barium sulfate and calcium sulfate are definitely inert in numerous applications, their presence as accompanying components is not disturbing and a highly desirable composite $TiO_2$ pigment is thus obtained.

If the components involved in the neutralization are present in exactly stoichiometric quantities, the process in accordance with the invention will result in a suspension which is virtually free of dissolved salts. This has the great advantage that the suspension can be dried directly without a need for additional filtering and washing steps. As a result, the finished product becomes directly available and the filtration problems otherwise involved in a washing step will be avoided.

In the process in accordance with the invention, the neutralizing components and/or the oxide or hydroxide or carbonate of calcium and/or barium are supplied as fine particulate solids or preferably in a suspension. Such suspension is suitably introduced into the suspension of metatitanic acid in sulfuric acid slowly and with stirring. The addition is terminated when a pH value from 6.5 to 7.0 has been reached. The mixture which contains the precipitate contains also calcium sulfate and/or barium sulfate in an amount from 1 to 25% by weight and preferably in an amount from 5 to 15% by weight. That content will depend on the amount of free and combined sulfuric acid which is contained in the suspension of metatitanic acid and which usually lies between 5 and 10%.

For various applications the product obtained by precipitation and the composite $TiO_2$ pigment must have specified primary particle sizes and/or specified surface areas. In an embodiment of the invention this is accomplished in that the virtually salt-free, neutral suspension of the coprecipitate is treated under hydrothermal conditions. For that purpose the suspension obtained by the precipitation is supplied directly and as such to an autoclave and is treated therein at temperatures from 100° to 500° C. for 30 to 120 minutes with constant stirring. That treatment may be effected in batches or in a continuously operated autoclave. The dependence of the surface areas of the composite products obtained after one hour on the temperature of the hydrothermal process is apparent from Table 1.

TABLE 1

| Temperature °C. | Surface Area m²/g |
|---|---|
| 150 | 155 |
| 200 | 95 |
| 215 | 85 |
| 250 | 55 |
| 275 | 48 |
| 310 | 43 |

The hydrothermal treatment permits the formation of an end product having a controlled surface area in the range from 30 to 250 m$^2$/g and a controlled particle size in the range from 0.007 to 0.35 micron.

In another embodiment of the invention the desired primary particle size and the desired surface area can be provided by a tempering process. For that purpose the coprecipitate which has been separated from the suspension and dried is treated at a temperature from 100° to 900° C. with agitation. The process can be performed in an intermittently operated batch furnace, which is indirectly heated, or in a continuously operated rotary kiln, which is indirectly or directly heated. In all cases a tempered product can be obtained with a controlled primary particle size in the range from 10 to 250 m$^2$/g. No SO$_2$ is eliminated in that process.

The surface area of the composite TiO$_2$ may be modified in that the thermally treated product is resuspended in an aqueous medium and is conventionally coated with an oxide hydrate or with mixed oxide hydrates of silicon, aluminum and/or zirconium in an amount from 0.5 to 10% of the TiO$_2$ content.

To form such coatings, water-soluble salts of silicon, aluminum or zirconium, particularly sodium silicate (Na$_2$SiO$_3$), sodium aluminate (NaAlO$_2$), aluminum sulfate (Al$_2$(SO$_4$)$_3$) or zirconyl sulfate (ZrOSO$_4$), are added to the suspension of the thermally treated product and the suspension is adjusted to a pH value from 3 to 9 so that the corresponding oxide hydrates are precipitated on the composite TiO$_2$ pigment. The product is separated and washed and subsequently dried.

In special applications, particularly in the field of paints, coloring materials and cosmetic products, it may be desirable to subject the composite products obtained in the process in accordance with the invention to an aftertreatment for improving their ability to be dispersed with organic compounds.

In dependence on the desired application it may be desirable to use long-chain fatty acids or their salts, such as stearic acid or stearates, or to use alpha-omega-trimethoxypolysiloxanes having a viscosity from 300 to 10,000 centipoises. These aftertreating components are desirably used in amounts from 0.5 to 20% by weight of the solids content. They may be applied in a friction mixer with utilization of the frictional heat or they may be admixed to the products before the latter are ground in an air or steam jet.

The composite titanium dioxide products obtained by the process in accordance with the invention may have particle sizes in the range of visible light wavelengths so that they have no optical activity, i.e., they are optically transparent. On the other hand, they may be optically transparent by absorbing ultraviolet radiation (wavelength <400 nm). Alternatively, the hydrothermal or tempering treatment may be performed to provide a primary particle size which will result in a dispersion also in the range of visible light. Opacity and ultraviolet absorption may be combined in products thus obtained. By the control of the surface area of the product in the process in accordance with the invention, the reactivity of the composite products can also be controlled. Composite products produced by the process in accordance with the invention have a wide field of application and may be used as raw materials in the production of catalysts, in the cosmetic and ceramic industries and as a precursor in the production of titanate.

SPECIFIC EXAMPLES

The invention will be explained in greater detail in the following Examples.

EXAMPLE 1

A metatitanic acid suspension is produced by the sulfate process as follows:

Ilmenite or high-titanium slags are solubilized by concentrated sulfuric acid. The resulting sulfates are dissolved and clarified. The iron salts are reduced to form ferrosulfate, which can easily be hydrolyzed, and are separated as such by crystallization and filtration. Steam is introduced into the filtrate to hydrolyze TiO$_2$.

The resulting metatitanic acid suspension contains 300 g TiO$_2$/liter and about 6% of free and combined sulfuric acid and is reacted at 60° C. and with moderate stirring with a barium hydroxide suspension, which contains 100 g/l barium hydroxide. The reaction is continued until the pH value lies between 6.5 and 7.

The required barium hydroxide suspension is added slowly during two hours. When the addition has been terminated, the suspension is stirred for two additional hours. The solids are subsequently separated and are dried in a drying cabinet at 105° C. The composite product has a pure white color and has a surface area of 220 m$^2$/g.

EXAMPLE 2

Solid barium carbonate is continuously added with strong stirring to a metatitanic acid suspension which has been formed in the sulfate process described in Example 1 and contains 300 g TiO$_2$/liter and 6% combined and free sulfuric acid and which is at a temperature of 60° C. during the addition. The barium carbonate is added in such a quantity that a pH value between 6.5 and 7 is obtained.

When the addition of barium carbonate has been terminated, the stirring of the neutralized suspension is continued for 2 additional hours. The suspension is subsequently filtered and the solids are dried in a drying cabinet at 105° C. The resulting product is pure white and has a surface area of 230 m$^2$/g.

EXAMPLE 3

A neutralized suspension which as been formed in accordance with Example 1 and has a pH value of 7 and a solids content of 200 g/l is heated in an enamelled laboratory autoclave at 200° C. for 1 hour. The suspension is subsequently filtered and the filter cake is dried in a drying cabinet. The product has a pure white color and has a surface area of 90 m$^2$/g.

EXAMPLE 4

A product as obtained in Example 1 is tempered at 500° C. for 4 hours. An evolution of gas is not observed during that treatment. The resulting product has a pure white color and has a surface area of 110 m$^2$/g.

EXAMPLE 5

A product obtaine in accordance with Example 4 is fed to a friction mixer, which is provided with a speed indicator and a temperature indicator. 5% by weight stearic acid are added. Mixing is effected by the mixing tools rotating at a speed of 3000 r.p.m. and is continued until the charge has reached a temperature of 75°. The product is subsequently cooled in a cooling mixer. The resulting product is white. The stearic acid has reacted

We claim:

1. A method of producing a composite uncoated $TiO_2$ pigment having a controlled surface area in the range of 30 to 250 $m^2/g$ and a controlled particle size in the range of 0.007 to 0.35 microns and containing an inert extender, which comprises the steps of:
   (a) forming metatitanic acid suspension containing free and combined sulfuric acid and substantially free from chromophoric substances;
   (b) neutralizing said metatitanic acid suspension with at least one compound selected from the group which consists of calcium oxide, calcium hydroxide, calcium carbonate, barium oxide, barium hydroxide, barium carbonate, and mixtures thereof in an amount substantially stoichiometrically equivalent to the total sulfate of said solution, thereby coprecipitating in an intimate mixture with metatitanic acid at least one inert extender selected from the group which consists of calcium sulfate and barium sulfate;
   (c) subjecting the coprecipitate formed in step (b) to a hydrothermal treatment by heating said coprecipitate in an autoclave at a temperature of 100° to 500° C. for 30 to 120 minute prior to recovering the coprecipitate and establishing the controlled specific surface area of the coprecipitate of 30 to 250 $m^2/g$, the hydrothermal treating temperature being inversely proportional to the specific surface area of the coprecipitate;
   (d) recovering the coprecipitate formed in steps (b) and (c); and
   (e) drying the coprecipitate recovered in step (d) to recover the composite $TiO_2$ pigment prior to coating said pigment.

2. The method defined in claim 1 wherein said inert extender is precipitated in said coprecipitate in an amount of 1 to 25% by weight thereof.

3. The method defined in claim 2 wherein said inert extender is precipitated in said coprecipitate in an amount of 5 to 15% by weight thereof.

4. The method defined in claim 1, further comprising the step of coating the dry coprecipitate with an oxide hydrate or mixed oxide hydrates of at least one element selected from the group which consists of silicon, aluminum and zirconium in an amount of 0.5 to 10% of the $TiO_2$ content of the dry coprecipitate.

5. The method defined in claim 1 wherein the dried coprecipitate of step (e) is aftertreated with a higher fatty acid of a metal salt thereof, or with a organo polysiloxane in an amount of 5 to 20% by weight of the dried coprecipitate.

* * * * *